Feb. 14, 1967    A. K. NEWMAN    3,303,718
GOVERNOR
Filed Oct. 21, 1964    2 Sheets-Sheet 1

Feb. 14, 1967  A. K. NEWMAN  3,303,718
GOVERNOR

Filed Oct. 21, 1964  2 Sheets-Sheet 2

United States Patent Office 3,303,718
Patented Feb. 14, 1967

3,303,718
GOVERNOR
Albert K. Newman, Noroton, Conn., assignor to Textron Inc., Providence, R.I., a corporation of Rhode Island
Filed Oct. 21, 1964, Ser. No. 405,390
10 Claims. (Cl. 74—572)

The present invention relates to means for controlling the speed of rotating shafts, such means being herein referred to as governors. There are many applications in which speed control is needed. For example, when an electric generator is driven by an internal combustion engine, it is desirable to maintain the speed of the engine and generator as nearly constant as possible in order to provide a substantially constant voltage output despite variations in load. If the generator is of the alternating current type, speed control is particularly important in order to maintain the frequency of the current output substantially constant. Speed control is likewise necessary or desirable for internal combustion engines driving other loads.

It is an object of the present invention to provide a governor having good sensitivity and also good stability over a substantial range of speeds. Moreover, in accordance with the invention, there is provided a governor of simple construction which is easily installed and is of lightweight and compact size so as to be particularly suitable for use in portable equipment, such as small portable generator units.

Figure 1:
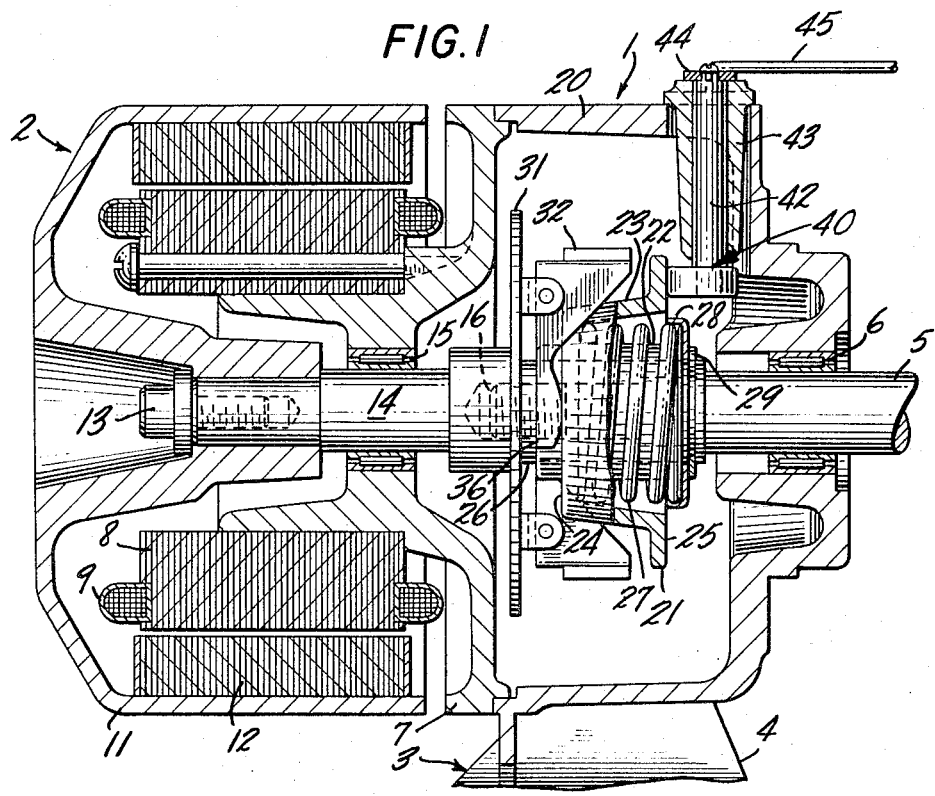
Figure 2:
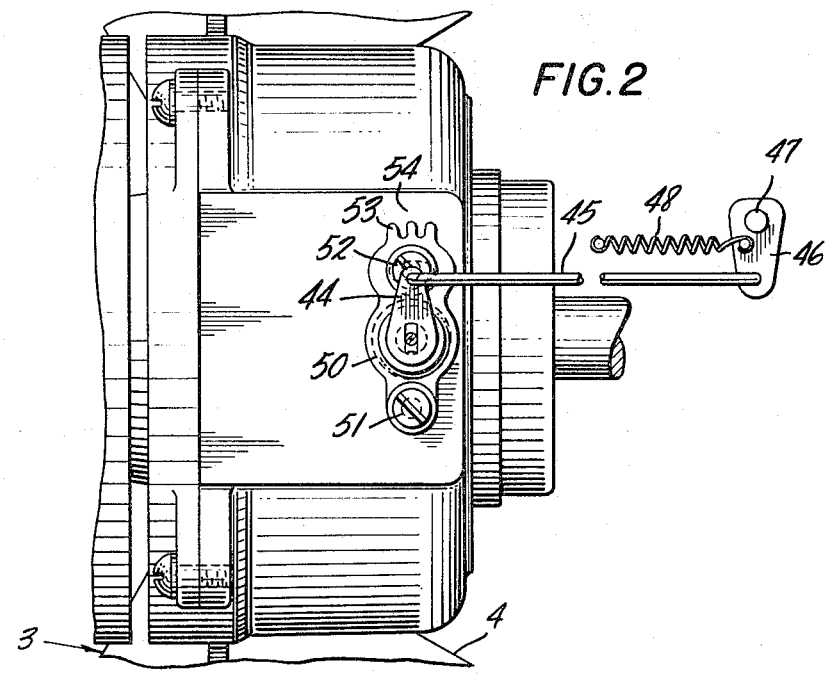
Figure 3:
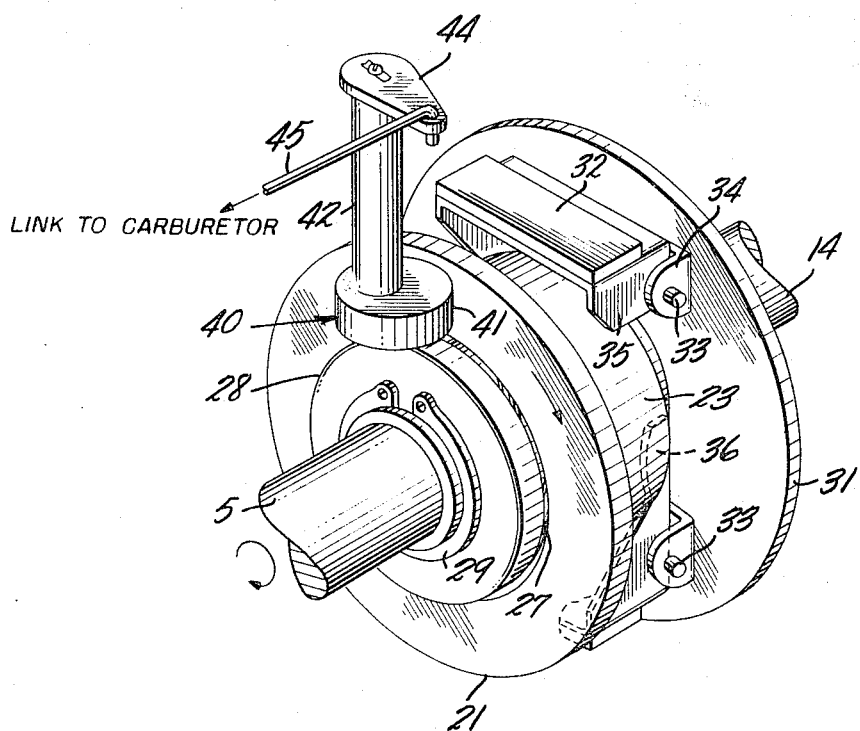
Figure 4:
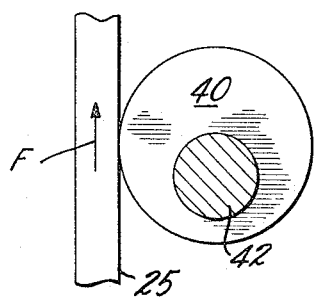

The objects, features and advantages of the invention will appear more fully from the following description and claims in conjunction with the accompanying drawings which illustrate, by way of example, a preferred embodiment of the invention and in which FIG. 1 is a partial axial section of a motor generator unit in which a governor in accordance with the present invention is incorporated, FIG. 2 is a partial top plan view, FIG. 3 is a schematic perspective view illustrating operation of the governor, and FIG. 4 is a fragmentary schematic view further illustrating the operation.

In the accompanying drawings, a governor 1 in accordance with the invention is illustrated in conjunction with motor generator set comprising an electric generator 2 and an internal combustion engine 3 of which only a portion of the casing 4 and a portion of the drive shaft 5 are shown, the engine being otherwise of any desired construction. The shaft 5 is the crankshaft or other output shaft of the internal combustion engine 3 and is rotatably supported by suitable bearings of which one is shown at 6. Suitable means such as a resilient pad or shim (not shown) is provided for substantially preventing endwise movement of the shaft 5.

The generator 2 is shown as comprising a frame or support 7 for a stator having core portions 8 and windings 9. A cup-shaped rotor 11 carrying permanent magnets 12 is secured by a stud bolt 13 on the end of a shaft extension 14 rotatably supported by a bearing 15 and screwed onto a threaded reduced end portion 16 of the drive shaft 5. The rotor 11 of the generator 2 preferably serves as a flywheel for the internal combustion engine 3.

The governor 1 is enclosed in a housing 20 which may be a portion of the engine or generator casing or a separate enclosure. The governor comprises a control member which rotates with, but is axially movable on the rotating shaft 5, spring means for biasing the control member in one direction, speed responsive means for moving the control member in the opposite direction against the bias and cam means for sensing axial movement of the control member. As illustrated in FIGURES 1 and 3, the control member comprises a bobbin 21 having an inner sleeve portion 22, a radially spaced outer sleeve portion 23, an integral base portion 24 connecting the two sleeve portions at one end and a radially projecting flange portion 25 provided at the opposite end of the outer sleeve portion 23. The inner sleeve portion 22 is axially slidable on a bushing 26 on the shaft 5. While the bobbin 21 may, if desired, be keyed to the bushing 26 which in turn is fixed with respect to the shaft 5, this is not ordinarily necessary as the biasing means and speed responsive means acting on the bobbin 21 cause it to rotate with the shaft. The outer end face of the flange portion 25 is a smooth surface of revolution and can, if desired, be inclined so as to be conical, but is shown as being substantially radial so as to lie in a plane perpendicular to the shaft 5.

The means for biasing the bobbin 21 is shown as comprising a helical compression spring 27 which surrounds the inner sleeve portion 22 of the bobbin and projects beyond the end of the sleeve. One end of the spring 27 bears against the inner face of the base portion 24 of the bobbin while the opposite end bears against an annular cupped retainer 28 secured on the shaft 5 in any suitable manner for example by a spring snap washer 29. It will be seen that the spring 27 biases the bobbin 21 toward the left as viewed in FIGURE 1.

The speed responsive means for moving the bobbin 21 in the opposite direction against the bias provided by the spring 27, in proportion to the rotational speed of the shaft 5, is shown as comprising a supporting disk 31 which is fixedly held between the shaft extension 14 and the bushing 26 on the drive shaft 5. One or more weights 32 are pivotally mounted on the support disk 31, two diametrically opposite weights being shown by way of example in the drawings. Pivotal mounting of the weights 32 on the disk 31 is shown as being provided by pivot pins 33 extending through bracket portions 34 provided on the disk and end flange portions 35 of the weights. The centers of gravity of the weights 32 are farther from the disk 31 than the pivot pins 33 so that centrifugal force produced by rotation of the shaft 5 and disk 31 tends to swing the weights 32 outwardly about their pivots. Each of the weights 32 is provided with an arm 36 which extends inwardly and bears on the base portion 24 of the bobbin 21. The arm 36 is conveniently formed as an extension of the flange 35 at one end of the weight. The arms of the oppositely disposed weights 32 are at opposite sides of the shaft 5 and bear on the base portion of the bobbin 21 at approximately diametrically opposite points. With the arrangement shown and described, it will be seen that the centrifugal force acting on the weights 32 tends to swing the weights outwardly so that the arm 36 press the bobbin 21 toward the right as viewed in FIGURE 1 against the bias provided by spring 27. If the speed of rotation of shaft 5 increases, the resulting increased centrifugal force moves the bobbin 21 farther to the right against the action of spring 27. The position of the bobbin 21 is thus indicative of the speed of rotation of the shaft 5.

The means for sensing the axial position of the bobbin 21 is shown in FIGURES 1, 3 and 4 as comprising a rotatable cam 40 having a cam face 41 engaging the outer end face of the flange 25 of the bobbin. The cam 40 is fixed on the lower end of a shaft 42 rotatably supported by a bearing 43. The axis of the shaft 42 intersects the axis of the drive shaft 5 and is shown as being substantially perpendicular to the drive shaft axis. An arm 44 on the upper end of the shaft 42 is connected by suitable linkage 45 to means for regulating the speed of the internal combustion engine 3, shown by way of example in FIGURE 2 as an arm 46 on a throttle shaft 47 of the carburetor or other speed regulating means of the engine. A light spring 48 (FIG. 2), which may for example be the return spring of the butterfly valve of the engine carburetor, acts through the linkage 45 to apply to the shaft 42 a rotational bias tending to turn the cam 40 in a counterclockwise direction as viewed in FIG. 4.

The portion of the cam surface 41 which engages the flange 25 of bobbin 21 is of varying radius with respect to the axis of shaft 42, with the radius increasing in the direction of movement of the adjacent portion of flange 25 as indicated by the arrow F in FIGURE 4. Such a surface is provided by an evolute, Archimedean spiral or other suitable curve. However, it has been found that a suitable cam surface can be provided in a more convenient manner merely by using a circular cam which is mounted eccentrically as shown in FIG. 4. Only a portion of the periphery of the cam which is less than 180° is used as the cam surface engaging the flange 25 of the bobbin 21. Because of the varying radius of the cam surface 41, the force exerted by weights 32 tending to move the bobbin 21 toward the right as viewed in FIGS. 1 and 4 would tend to turn cam 40 in a clockwise direction (FIG. 4) against the torsional bias provided by the spring 48 (FIG. 2). However, the rate of variation of the radius of the cam surface 41 is so gradual that if the bobbin 21 were not rotating, the normal frictional forces between the cam surface and the flange 25 of the bobbin would prevent rotation of the cam. However, this frictional blocking action is avoided by reason of the fact that the bobbin 21 rotates with shaft 5 and hence the flange 25 engages the cam surface 41 with a wiping action which assists in turning the cam 40 in a clockwise direction as viewed in FIGURE 4 and thus provides an amplifying effect or "power drive" for the sensing mechanism. By reason of this wiping action, a very light pressure of the flange 25 is sufficient to turn the cam 40 and thereby actaute the speed regulating means 46, 47 for the engine through the connection provided by linkage 45. Conversely when the bobbin 21 is moved toward the left (FIG. 1) by the biasing spring 27 upon a decrease in the rotational speed of shaft 5, a very small force is all that is required to cause the cam 40 to follow the movement of the bobbin. Hence, the spring 48 (FIG. 2) providing a torsional bias on the cam 40 is preferably very light. Thus, the cam 40 senses the position of the bobbin 21 without exerting forces on the bobbin materially affecting its position as determined by the rotational speed of shaft 5 and the resulting centrifugal force acting on the weights 32. Moreover, the gradual increase in the radius of the cam surface 41 makes it possible to turn the shaft 42 through a substantial angle with only a slight axial movement of the bobbin 21. There is thus provided a high degree of sensitivity while at the same time maintaining stability of the system.

Means is provided for setting the speed of rotation of the motor generating unit by selectively positioning the axis of the cam shaft 42 with respect to the bobbin 21. As illustrated in FIGURES 1 and 2, the bearing 43 by which cam shaft 42 is rotatably supported, is in the form of a sleeve carried by an arm 50 pivotally mounted in the casing 20 by a screw 51. The sleeve 43 extends down through a hole in the casing 20 sufficiently large to permit limited movement of the sleeve toward and away from the bobbin 21. At the opposite end of the arm 50, a screw 52 extends down through an elongated hole in the arm permitting the arm to swing about the pivot screw 51 and thereby move the bearing sleeve 43 toward or away from the bobbin 21. When the bearing sleeve has been moved to selected position, the screw 52 is tightened to hold the sleeve 43 in the position selected. A plurality of points 53 on the end of arm 50 opposite the pivot 51, co-operate with an index mark 54 on the casing to indicate the position of the bearing sleeve 43. Since the sleeve 43 extends downwardly from the mid-portion of the arm 50, the movement of the end of the arm carrying points 53, is approximately twice as great as the movement of the bearing sleeve so as to provide an amplifying position indicator facilitating more exact positioning of the sleeve.

The operation of the governor will be apparent from the foregoing description. When the drive shaft 5 is stationary or running at low speed, the bobbin 21 is held in the left hand position as viewed in FIGURE 1 by the spring 27. In this position, the engine throttle is opened permitting the engine to accelerate. As the speed of the shaft 5 increases, the increasing centrifugal force acting on the weights 32 tends to swing the weights outwardly so that the arms 36 move the bobbin 21 axially toward the right (FIG. 1). This movement of the bobbin 21 rotates cam 40 and shaft 42 in a clockwise direction (FIGS. 2 and 4), thereby progressively closing the engine throttle. When the engine reaches the desired speed, any minor deviations from the selected speed result in slight axial movement of the bobbin 21 which is sensed by the cam 40 so as to adjust the throttle to correct for the speed variation. The engine and generator are thereby caused to operate at a substantially constant speed.

The interengaging surfaces of the cam 40 and flange 25 of the bobbin 21 are preferably formed of materials having low friction and high wear resistance. By reason of the relatively light pressure between the flange 25 and the cam 40, it has been found that the wearing of the cam and the flange surfaces presents no problem.

While the preferred embodiment of the invention has been illustrated in the drawings and herein particularly described, it will be understood that the invention is in no way limited to this embodiment and that structural modifications may be made within the scope of the appended claims.

What I claim is:
1. Speed control means comprising a rotating shaft; means for regulating the speed of rotation of said shaft; a control member on said shaft and rotatable therewith while being axially movable thereon, said control member having a surface of revolution with a radial component, first means for biasing said control member in one direction, said first means being rotatable with said control member, means responsive to the speed of rotation of said shaft for moving said control member proportionally in the opposite direction against said bias with increase of speed, rotatable cam means having a peripheral cam surface engaging said surface of the control member, said cam surface having a radius progressively increasing in the direction of movement of the portion of said control member adjacent said cam means, second means for torsionally biasing said cam means to turn in a direction opposite to the direction of movement of the adjacent portion of said control member and means connecting said cam means with said speed regulating means, whereby movement of said control member toward said cam means upon variation of shaft speed causes said surface of revolution to engage said cam surface with a wiping action to turn said cam means against its bias and thereby act on said speed regulating means to counteract said variation of speed.

2. Speed control means comprising a rotating shaft, means for regulating the speed of rotation of said shaft, a sleeve member axially slidable on said shaft and rotatable therewith, said sleeve member having an annular flange portion, spring means around said shaft and acting between said sleeve and an abutment on said shaft to bias said sleeve to move axially in one direction on, said spring means rotating with said sleeve and shaft, means responsive to the speed of rotation of said shaft for moving said sleeve proportionally in the opposite direction against said bias upon increase of speed, cam means rotatable about an axis extending transversely of said shaft and having a peripheral cam surface engaging said flange portion of said sleeve, said cam surface having a radius progressively increasing in the direction of movement of said flange portion of said sleeve past said cam means, means torsionally biasing said cam means to turn in a direction opposite to the direction of movement of said flange past said cam means, and means connecting said cam means with said speed regulating means, whereby movement of said sleeve member toward said cam means upon variation of shaft speed causes said flange portion to engage said cam surface with a wiping action to turn said cam means against its bias and thereby act on said speed regulating means to counteract said variation of speed of said shaft.

3. Speed control means comprising a rotating shaft, means for regulating the speed of rotation of said shaft, a flange fixed on said shaft, an annular control member on said shaft adjacent said flange and rotatable with said shaft while being axially movable thereon, said control member having a surface of revolution concentric with said shaft and with a radial component, spring means acting between said control member and said shaft to bias said control member toward said flange, said spring means rotating with said control member and shaft, at least one weight pivotally mounted on said flange to swing about an axis approximately perpendicular to a radius of said shaft bisecting said weight and having an arm bearing on said control member to move said control member in a direction away from said flange when said weight is moved outwardly from said shaft by centrifugal force, cam means rotatable about an axis extending transversely of said shaft and having a peripheral cam surface engaging said surface of revolution of said control member, said cam surface having a radius progressively increasing in the direction of movement of the adjacent portion of said control member, means for torsionally biasing said cam means to turn in a direction opposite to the direction of movement of the adjacent portion of said control member, and means connecting said cam means with said speed regulating means, whereby movement of said control member toward said cam means upon variation of speed of said shaft causes said surface of revolution to engage said cam surface with a wiping action to turn said cam means against its bias and thereby act on said speed regulating means to counteract said variation of speed.

4. Speed control means comprising a rotating shaft, means for regulating the speed of rotation of said shaft, a control member axially slidable on said shaft and rotatable therewith, said control member comprising an inner sleeve portion axially slidable on said shaft, an outer sleeve portion radially spaced from said inner sleeve portion, a base portion integrally joining said inner and outer sleeve portions at one end and a flange projecting radially outwardly from said outer sleeve portion at the end opposite said base portion, shoulder means on said shaft adjacent the flange end of said control member, a coil spring surrounding said inner sleeve and acting between said base portion and said shoulder means to bias said control member in an axial direction away from said shoulder means, said spring rotating with said control member and shaft, speed responsive means on said shaft for moving said control member axially in a direction toward said shoulder means on increase of speed of rotation of said shaft, cam means rotatable about an axis extending transversely of said shaft and having a peripheral cam surface engaging said flange of said control member, said cam surface having a radius progressively increasing in the direction of movement of said flange past said cam means, means torsionally biasing said cam means in a direction opposite to the direction of movement of said flange past said cam means, and means with said speed regulating means, whereby movement of said control member toward said cam means upon variation of shaft speed causes said flange to engage said cam surface with a wiping action to turn said cam means against its bias and thereby act on said speed regulating means to counteract said variation of shaft speed.

5. Speed control means according to claim 4, in which said speed responsive means comprises support means on said shaft spaced from said base portion of said control member, a plurality of weights pivotally mounted on said support means to swing outwardly by centrifugal force about axes approximately perpendicular to radii of said shaft bisecting said weights respectively, each of said weights having an arm extending inwardly and bearing on said base portion of said control member, whereby centrifugal force acting on said weights tends to swing said weights outwardly about their respective pivots and thereby cause said arms to press on said base portion in a direction to move said control member toward said shoulder means against the bias of said coil spring.

6. Speed control means comprising a first rotating shaft, means for regulating the speed of rotation of said shaft, a control member on said shaft and rotatable therewith while being axially movable thereon, said control member having a surface of revolution approximately normal to said shaft, first means for biasing said control member in one direction, said first means rotating with said control member, means responsive to the speed of rotation of said shaft for moving said control member proportionally in the opposite direction against said bias upon increase of speed, a second shaft rotatable about an axis approximately radial to said first shaft and adjacent said surface of revolution of said control member, a cam fixed on said second shaft and having a peripheral cam surface engaging said surface of revolution, said cam surface having a radius progressively increasing in the direction of movement of the portion of said control member adjacent said cam, means torsionally biasing said second shaft to turn said cam in a direction opposite to the direction of movement of the adjacent portion of said control member, and means connecting said second shaft with said speed regulating means, whereby movement of said control member toward said cam upon variation of speed of rotation of said first shaft causes said surface of revolution to engage said cam surface tangentially with a wiping action to turn said cam and second shaft against said torsional bias and thereby act on said speed regulating means to couneract said variation of speed.

7. Speed control means according to claim 6, further comprising bearing means rotatably supporting said second shaft, means for moving said bearing means in a direction toward and away from said control member and means for securing said bearing means in selected position.

8. Speed control means according to claim 7, further comprising amplifying indicating means for indicating the position of said bearing means.

9. Speed control means according to claim 6, in which said means torsionally biasing said control shaft is a light spring of sufficient strength to cause said cam to follow the movement of said control member without exerting forces on said control member materially affecting its position as determined by said means biasing said control member and said speed responsive means.

10. Speed control means according to claim 1, in which said means for torsionally biasing said cam means is a light spring of sufficient strength to cause said cam to follow the movement of said control member without exerting forces on said control member materially affecting its position as determined by said means for biasing said control member and said speed responsive means.

References Cited by the Examiner
UNITED STATES PATENTS

| | | | |
|---|---|---|---|
| 1,041,643 | 10/1912 | Link | 73—530 |
| 1,325,478 | 12/1919 | Wells et al. | 73—534 |
| 2,897,309 | 7/1959 | Randol | 73—550 |

FOREIGN PATENTS

| | | |
|---|---|---|
| 21,020 | 7/1929 | Australia. |

FRED C. MATTERN, Jr., *Primary Examiner.*
W. S. RATLIFF, *Assistant Examiner.*